United States Patent [19]

Boivin

[11] 4,073,007
[45] Feb. 7, 1978

[54] METHOD AND APPARATUS FOR MEASURING STRESS IN A BAND SUBJECTED TO TENSION AND APPLICATIONS THEREOF, IN PARTICULAR FOR THE MEASUREMENT OF THE STATE OF PLANARITY OF SUCH A BAND

[75] Inventor: Pierre André Boivin, Gueugnon, France

[73] Assignee: Forges de Gueugnon, Paris, France

[21] Appl. No.: 681,756

[22] Filed: Apr. 29, 1976

[30] Foreign Application Priority Data

May 2, 1975 France .................................. 75 13817

[51] Int. Cl.[2] ................................................ G01L 5/10
[52] U.S. Cl. ..................................... 364/508; 73/627; 364/472
[58] Field of Search .................... 235/151.3, 151.32; 73/67.2, 71.5 R, 71.7, 88 R, 89, 95, 95.5, DIG. 1, 67.85; 72/199, 205, DIG. 4, DIG. 29; 340/1

[56] References Cited

U.S. PATENT DOCUMENTS

| | | | |
|---|---|---|---|
| 3,342,284 | 9/1967 | Baird | 73/67.7 X |
| 3,371,660 | 3/1968 | Carlin | 73/67.8 X |
| 3,380,293 | 4/1968 | Murphy | 73/67.7 |
| 3,433,058 | 3/1969 | Tobin, Jr. et al. | 73/105 X |
| 3,442,579 | 5/1969 | Friedberg | 73/67.7 X |
| 3,745,833 | 7/1973 | Armstrong | 73/67.8 R |

*Primary Examiner*—Edward J. Wise

[57] ABSTRACT

A method and apparatus for measuring a mechanical characteristic of a band subjected to tension. A disturbance is produced, for example by a hammer, transversely of the band and there is measured the time that the disturbance takes to travel through a predetermined distance along the band. This measurement is related to the value of the tensile stress in the band. In this way planarity defects in the band can be detected by comparison of the times the disturbance takes to travel in different regions of the band.

26 Claims, 6 Drawing Figures

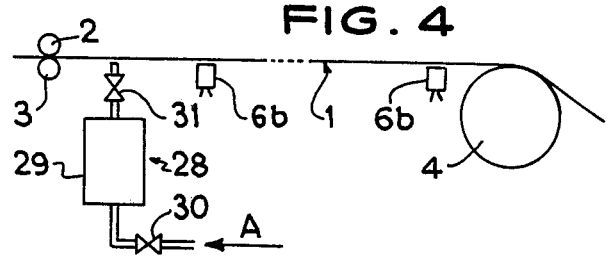
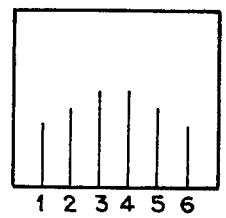
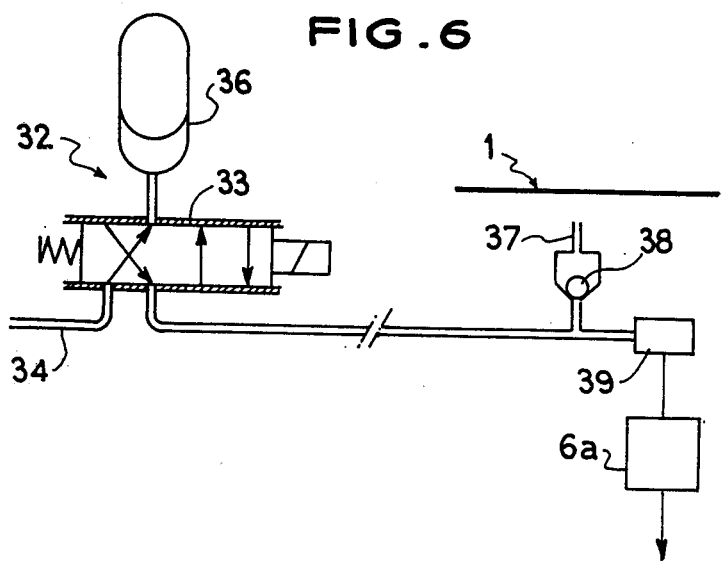

METHOD AND APPARATUS FOR MEASURING STRESS IN A BAND SUBJECTED TO TENSION AND APPLICATIONS THEREOF, IN PARTICULAR FOR THE MEASUREMENT OF THE STATE OF PLANARITY OF SUCH A BAND

The present invention relates to processes and apparatus for measuring stress in a band subjected to tension and applications thereof, in particular for detecting and measuring defects in the planarity of such a band.

Defects in the planarity of a band of sheet metal are visible in the absence of a tension upon the band.

On the other hand, when the band is subjected to tension, the shortest longitudinal regions are the first to lengthen and, when the tension reaches a sufficient value, the sheet appears to be planar and defects in the planarity can no longer be detected visually.

Now it is known that the index of planarity $a/\lambda$ of a band whose middle part is taut and whose edges have corrugations, characteristic of a defect of planarity, can be related to a gradiant of stress in the band in accordance with the following formula:

$$\Delta\sigma = E . \pi 2 (a)^2/(\lambda)^2$$

in which a is the half-amplitude of a corrugation
$\lambda$ is the wavelength of one corrugation
E is Young's modulus
$\Delta\sigma$ representing the increase in stress required to cause the defect of planarity to disappear.

Consequently, it is possible to obtain a good representation of the defects of planarity of a band subjected to tension by measuring the value of the tensile stress, that is to say the value of the tensile force applied to an element of unit area of the band, produced at each one of a plurality of points of a cross-section of the band.

When cold rolling the bands and especially on a Sendzimir rolling mill in which the tensile stresses are high, the appearance of the sheet issuing from the cage does not enable the planarity that the band would have in the absence of tension to be judged, and it is therefore particularly useful to detect and measure, at this stage, the defects of planarity of the band so as to enable an operator to act constantly on the profile of the rolls of the cage of the rolling mill, for example by acting on the deflection of these rolls by means of regulating screws so as to modify the distribution of the tensile forces exerted on the band over the width of the band. Several apparatus exist at the present time which permit a measuring of the defects of planarity of the band issuing from a rolling mill by the measurement of the stresses to which this band is subjected. These apparatus may be classified into two types: those which operate by contact with the band and those which operate without contact with the band.

With the apparatus operating by contact with the band, the tensile stress in the band is determined at different points of its width, either, depending on the apparatus employed, by means of rollers which bear against the band (but here there is a risk of a marking of the band and the rollers must be perfectly cylindrical), or by measuring the deflection of a reflecting roll of the rolling mill by means of sensors disposed along this roll (but this measurement is not very precise owing to the phenomenon of integration due to the rigidity of the roll), or by means of deflecting rolls of the rolling mill, each of which is constituted by a series of adjoining cylindrical sections in which a plurality of magnetostriction gauges are evenly spaced apart which enable the stress in the band in the region of each section to be measured (but the large number of gauges necessary renders this apparatus expensive and of poor reliability). In a modification of the last-mentioned apparatus, the stress is measured by means of a cushion of air produced under the sections of the deflecting roll. Although it is lighter and smaller than the last-mentioned apparatus, the modified apparatus has the same drawbacks as concerns its cost, reliability and the risk of marking the band.

Among the apparatus of the second type two are known in which a deflection is given to the band, in one apparatus with an electromagnet and in the other with an air cushion, and this deflection is measured with an air cushion device so as to enable the distribution of the stresses to be deduced therefrom. However, the apparatus employing an electromagnet cannot be used with bands of a non-ferromagnetic material and that employing an air cushion has a high sound level and results in projections of fluid and does not enable the stresses in the regions in the vicinity of the edges of the band to be known.

A third apparatus is known which operates without contact with the band in which the variation in the magnetic permeability of the band, as a function of the stress in the latter, is measured, but, as in the first mentioned apparatus, this apparatus is not applicable to bands of a material which is non-ferromagnetic.

Another machine is known in which a disturbance or shaking is produced in the band and the frequencies pertaining to various longitudinal regions of the band are measured so as to deduce therefrom the distribution of the stresses. However, this technique requires that the band be put in vibration in a known manner between at least two parallel supports oriented transversely of the longitudinal direction of the band, that is to say, there must be obtained a reflection of the wave on embedments or supports in order to obtain a resonant frequency. Consequently, this technique cannot be employed on any type of rolling mill and in particular Sendzimir rolling mills.

The present invention relates to a method and an apparatus for measuring stress in a band subjected to tension and to the application thereof to the measurement of the state of planarity of such a band, which method and apparatus do not have the aforementioned drawbacks and in particular may be employed with any type of rolling mill and for any type of band.

According to the invention, there is provided a method for measuring a mechanical characteristic in a band subjected to tension comprising producing a transverse disturbance in the band and measuring a characteristic of propagation of said disturbance along the band which is related to the value of the tensile stress in the band, wherein the time that said disturbance takes to travel through a predetermined distance along the band is measured.

According to one feature of the invention, given this predetermined distance, the velocity of propagation c of said disturbance is calculated.

According to another feature of the invention, the tensile stress $\sigma/\lambda$ in the band is calculated by means of the formula $\sigma = p\text{-}c^2$ in which p is the volumic mass of the band.

According to yet another feature of the invention, said time $t$ that the disturbance takes to travel through said predetermined distance in each one of a plurality of longitudinal regions of the band, arranged, parallel to the longitudinal direction of the band, between one edge and the other edge of the latter, is measured, and a comparison is made of said measured times t, which comparison represents the state of planarity of the band.

According to another feature of the invention, the velocity of propagation of said disturbance in each one of a plurality of longitudinal regions of the band, arranged, parallel to the longitudinal direction of the band, between one edge and the other of the latter, is calculated, and a comparison is made of said calculated velocities of propagation, which comparison represents the state of planarity of the band.

Another object of the invention is to provide an apparatus for measuring a mechanical characteristic in a band subjected to tension, of the type comprising means for producing a transverse disturbance in the band, detecting means for producing a signal which is responsive to the detection of said disturbance, and an electric measuring circuit adapted to receive said signal and measure the characteristic of propagation of said disturbance which is related to the value of the tensile stress of the band, wherein said detecting means comprise a first detecting device and a second detecting device disposed at a given distance from each other along said band and adapted to produce in succession a first electric pulse and a second electric pulse in response to the disturbance of the band in their region, said electric measuring circuit being adapted to measure the time that elapses between said pulses.

According to a feature of the invention, said means for producing a transverse disturbance in the band and said corresponding electric measuring circuit are associated in each one of a plurality of longitudinal regions of the band, arranged, parallel to the longitudinal direction of the band, between one edge and the other edge of the band.

Further features and advantages of the invention will be apparent from the ensuing description with reference to the accompanying drawings in which:

FIG. 4 is a diagrammatic side elevational view of a modification of the stress measuring apparatus according to the invention;

FIG. 5 is a representation on a cathode-ray screen of the distribution of the stresses in a band whose edges are flexible, and FIG. 6 is a diagrammatic view of another modification of the measuring apparatus according to the invention.

Figure 1:
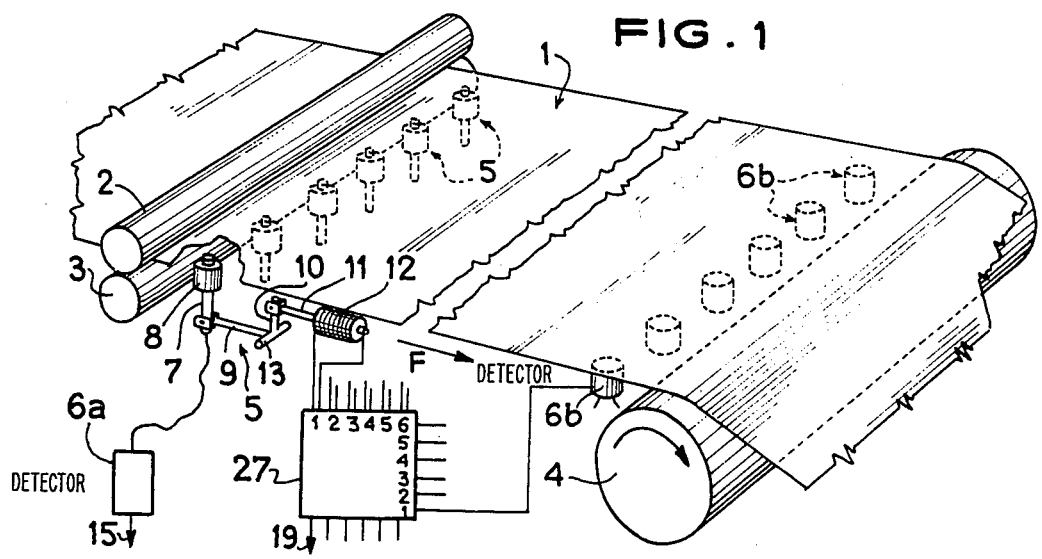
FIG. 1 is a diagrammatic perspective view of an apparatus for measuring the state of planarity of a band under tension, comprising a plurality of identical stress measuring apparatus according to the invention.

With reference to FIG. 1, there is seen a band 1 which is subjected to tension and issues from a rolling mill having two working rolls 2 and 3 and a deflecting roller 4 and travels in the direction of arrow F. An apparatus for measuring the state of planarity of the band 1 is disposed under the band 1 between the rolls 2 and 3 and the roller 4. This apparatus is constituted by six stress measuring apparatus evenly spaced apart from one edge to the other of the band 1.

Each stress measuring apparatus comprises means for producing a disturbance or shaking in the band and constituted by an electromagnetic hammer 5 and two devices 6a and 6b for detecting this disturbance. The electromagnetic hammer 5 comprises a vertical rod 7 constituting the hammer proper and slidably mounted in a guide cylinder 8 and pivoted at its lower end to one end of a branch 9 of a bell-crank whose other branch 10 is pivoted to one end of a horizontal plunger core 11 which extends through a control coil 12. The bell-crank is pivotable about a shaft 13 perpendicular to the two branches 9 and 10 so that displacement of the core in a horizontal direction causes a displacement of the rod 7 in a vertical direction.

The detecting device 6a is an electric circuit the closure of which is ensured by the contact between the rod 7 and the band 1 which produces an electric pulse at the moment of this contact.

The detecting device 6b is preferably an eddy current detector which operates without contact with the band 1 and produces in the latter eddy currents which are disturbed by a displacement of the band in a direction perpendicular to its plane produced by the arrival of a disturbance in the region of this detector, the latter delivering an electric signal of pulse type when it detects such a disturbance. This type of detector has the advantage of being capable of operating under both dynamic and static conditions and of not having its output signal modified by a fluid interposed between the detector and the band, if this fluid is not conductive. Moreover, as this detector has no mechanical contact with the band, it is very easy to employ, since it requires no delicate minute adjustment of position. A particularly suitable detector of this type is that known under the name "KAMAN KD, 2300-10 CV".

Figure 2:
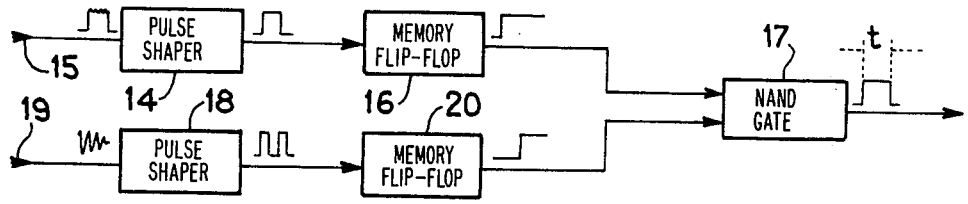
FIG. 2 is a block diagram of the main electronic circuit of the apparatus according to the invention.

The main circuit shown in FIG. 2 comprises a threshold stage 14 whose input 15 is connected to the detecting circuit 6a to receive an electric pulse when the rod 7 comes in contact with the band 1. The output of the threshold stage 14 is connected to the input of a memory flip-flop 16 whose output is connected to one of the two inputs of a NAND gate 17. Likewise a threshold stage 18 comprises an input 19 connected to the detector 6b to receive a pulse in response to a disturbance of the band 1 in the region of this detector 6b, and an output connected to the input of a memory flip-flop 20 whose output is connected to the other input of the NAND gate 17.

This apparatus operates in the following manner:

When a current is fed to the coil 12, the core 11 moves suddenly (to the right as viewed in FIG. 1) and throws the rod 7 upwardly. Preferably, the current in the coil 12 is cut off before the rod 7 reaches the band 1 so that the rod 7 continues its movement under the effect of its own inertia and rebounds only once on the band 1. When the rod 7 reaches the band 1, a pulse is applied by the circuit 6a to the input 15 of the threshold stage 14. This pulse is shaped by the threshold stage 14 and then applied to the memory flip-flop 16 which delivers a voltage step to the first input of the NAND gate 17.

The shock produced by the rod 7 produces a transverse disturbance or shaking in the band 1, that is to say, a disturbance or shaking in a direction perpendicular to the plane of the band 1. This disturbance is propagated along the band 1 and is detected in the course of this propagation by the detector 6b which then delivers a pulse-type signal to the input 19 of the threshold stage 18. This signal is shaped by the threshold stage 18 then applied to the memory flip-flop 20 which step delivers a voltage step to the second input of the NAND gate 17 after its first input has received the step applied by the memory flip-flop 16. These two successive voltage steps produce at the output of the NAND gate 17 a pulse whose width represents the time $t$ of propagation of the disturbance in the band between the rod 7 and the detector 6.

Figure 3:
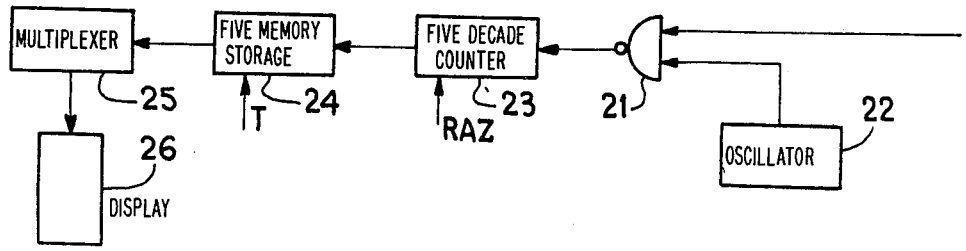
FIG. 3 is a block diagram of the counting and display circuit of the apparatus according to the invention.

The time $t$ may be measured directly by applying the output pulse from the NAND gate 17 to an oscilloscope and measuring the width of this pulse on the cathode-ray screen or by a counting circuit having a numerical display such as that which will now be described with reference to FIG. 3.

This circuit comprises a gate 21 whose two inputs are respectively connected to the output of the NAND gate 17 and to a clock 22, constituted, for example, by a very stable quartz oscillator of known frequency. The output pulse from the NAND gate 17 controls the opening and closing of the gate 21 and prohibits or authorizes the passage of the clock pulses. At the output of the gate 21 there is connected a counter 23 having five decades provided with a resetting input RAZ adapted to count the clock pulses that the gate 21 allows through. A unit 24 which comprises five memories and an input T for memory transfer signals, and a multiplexing circuit 25 connected to display modules 26, are associated with the unit 24. This conventional circuit permits the time $t$ of propagation to be displayed with good precision.

Now, this time $t$, given the distance $l$ between the rod 7 and the detector 6$b$, enables the velocity $c = 1/t$ of propagation of a disturbance in the band 1 to be measured. It is moreover known that $c = \sqrt{F\mu}$, in which F is the tensile force exerted on the band and $\mu$ the linear mass of the band, which may also be written $c = \sqrt{\sigma/p}$ in which $\sigma$ is the tensile stress in the band and $p$ the volumic mass of the band, that is to say $\sigma = p.c^2$. Thus it can be seen that, given the value of $p$, the measurement of the velocity of propagation $c$ enables the value of the stress in the band at the moment of the measurement to be determined. Instead of displaying the time, it is easy, by adding a conventional computer circuit, to display the value of $c$ or of $\sigma$ directly.

However, in the application of this stress measuring apparatus to the measurement of the state of planarity of a band, such a modification is unnecessary. As can be seen in FIG. 1, this apparatus for measuring the planarity of a band under tension is constituted by the assembly of a plurality of stress measuring apparatus according to the invention. The apparatus shown in FIG. 1 has six of these apparatus, but this number is not critical, and there may be as many apparatus as the width of the band 1 permits so as to obtain the desired precision of the planarity measurement. One of the advantages of the apparatus is that it has such a flexibility of adaptation to the requirements of practical utilization. Each pair comprising a hammer 5 and a detector 6 is aligned in a direction parallel to the longitudinal direction of the band, the hammers 5, on one hand, the detectors 6$b$, on the other, being evenly spaced apart from one edge to the other of the band 1 and aligned in a direction perpendicular to the longitudinal axis of the band 1. A switching and timing circuit 27 is connected to the supply terminals of the coils 12, to the outputs of the detectors 6$b$ and to the inputs 19 of the threshold stages 18 corresponding to the respective detectors 6$b$.

The circuit 27 controls the excitation of the coils 12 one after the other with an interval of time between each excitation which is such that the disturbance due to the excitation of one of the coils 12 is absorbed or damped when the following coil 12 is excited. Furthermore, in respect of each disturbance, the circuit 27 receives signals given out by the detectors 6$b$ but allows through only the signal given out by the detector 6$b$ corresponding to the hammer 5 which had produced this disturbance. Thus the stress measuring apparatus operate as described hereinbefore, and determine one after the other the time of propagation of a disturbance in the corresponding longitudinal region of the band 1. If the times of propagation displayed are different from one apparatus to another, this signifies that the band has planarity defects. Indeed, knowing that $\sigma = p.c^2 = p.l^2/t^2$, a difference $\Delta t$ of the time of propagation from one region to another corresponds to a difference of stress $$\Delta\sigma = -2p \cdot \frac{l^2 \cdot \Delta t}{t^3}$$

as $\Delta\sigma = E \pi 2 (a)^2(\lambda)^2$, the planarity defect is characterized by $$\frac{a}{\lambda} = \sqrt{\frac{-2pl^2}{E\pi^2} \cdot \frac{\Delta t}{t^3}}$$

By way of example, for a distance of $D = 500$ mm between the detecting devices, a volumic mass $p = 7.8$ kg/dm$^3$ of the band and tensile stresses $\sigma$ of 10, 20 and 30 kg/mm$^2$ the following theoretical values of $c$, $t$ and $d\sigma/dt$ are obtained:

|  | $\sigma$ | C | t | $\frac{d\sigma}{dt}$ |
|---|---|---|---|---|
| $p = 7,8$ kg/dm$^3$ | 10 Kg/mm$^2$ |  |  |  |
|  | $10^8 p$ | 113 m/s | 4,43 ms | $-4,44\ 10^{10}$ |
| $D = 0,5$ m | 20 kg/mm$^2$ |  |  |  |
|  | $20.10^7 p$ | 163 m/s | 3.06 ms | $-13,5\ 10^{10}$ |
|  | 30 kg/mm$^2$ |  |  |  |
|  | $30.10^7 p$ | 196 m/s | 2,55 ms | $-23,5\ 10^{10}$ |

The distance D must be such that the time of propagation $t$ of the disturbance be long enough to allow a precise measurement, but it must not exceed a value beyond which there would be an excessive damping or absorption of the amplitude of the disturbance. This distance may be between about 20 cm and about 1 m, and preferably between 50 cm and 80 cm.

Likewise, the interval of time between the excitation of the coils 12 must be such that, when a disturbance is produced in the band 1, the preceding disturbance of the band be roughly completely damped, that is to say, within the framework of the aforementioned values of $\sigma$ and of $p$, of the order of one second.

Bearing in mind the foregoing orders of magnitude, a clock frequency of the order of $10^5$ Hz gives good precision, of the order of 1%, of the measurement of the time of propagation $t$.

For obtaining a reading of the state of planarity of the band, there may be employed either the display for each section of the band of a numerical value representing the stress in this section, or, for example, the display on a cathode-ray screen of juxtaposed segments pertaining to the succession of sections from one edge to the other of the band, these segments having a length proportionate to the stress in the corresponding section. FIG. 5 represents such a display on a cathode-ray screen corresponding to a band whose edges are flexible and in respect of which the stresses were measured in six longitudinal sections.

In order to make a defect in the planarity of the band disappear, it is sufficient for an operator controlling the operation of the rolling mill to act on the means regulating the planarity of the band in such manner as to cancel out $\Delta t$, that is to say to obtain the same value of the time $t$ of propagation displayed by all the stress measuring apparatus, corresponding to equal stresses throughout the width of the band.

In order to do this, and in the known manner, the operator may act on the form of the grip through the agency of a camber on a duo or quarto rolling mill. In the case of a Sendzimir or Sundwig rolling mill, he may act on the form of the grip by varying the form of the bearing lines by the set of eccentrics.

Advantageously, these corrections may be effected by an automatic regulation system controlling the means regulating the tension of the band as a function of stress values measured by the apparatus measuring the planarity according to the invention.

The use of an electromagnetic hammer for producing a disturbance by a mechanical contact has the advantage of producing a very distinct disturbance and a starting pulse which very precisely corresponds to the contact of the rod or hammer 7 with the band.

This hammer could also be actuated pneumatically or hydraulically, etc. instead of by the coil 12.

However, it may be desirable to produce a disturbance or shaking without contact in order to avoid any risk of marking the band. FIG. 4 shows such an apparatus in which the electromagnetic hammer 5 shown in FIG. 1 is replaced by an electropneumatic device 28 comprising a tank 29 whose inlet conduit is connected to a source A of compressed air by way of an electrically-operated valve 30 and whose outlet conduit, which opens out in proximity to the band 1, also has an electrically-operated valve 31. This apparatus also has a second eddy current detector 6b adapted to replace the detecting circuit 6a and to apply a signal to the threshold stage 14 when it detects a disturbance.

This electropneumatic device 28 operates in the following manner:

In a first stage, the valve 30 is opened and the valve 31 closed, so that the tank 29 is charged or filled. When the tank 29 has been charged, the valve 30 is closed and then the valve 31 is opened and the tank 29 discharges through its outlet conduit and thus produces a disturbance or shaking in the band 1. The valve 31 is then closed and the same sequence of operations is recommenced so as to produce a new disturbance.

The two detectors 6b detect a disturbance in the band one after the other and apply respectively a signal to the input 15 and to the input 19, the NAND gate 17 producing, as before, a pulse whose width represents the time of propagation $t$.

FIG. 6 shows another apparatus in which the electromagnetic hammer 5 shown in FIG. 1 is replaced by an electrohydraulic device 32 comprising a 4-way electromagnetic control valve 33 to which there are connected an input conduit 34, an output conduit 35, and an accumulator 36. The conduit 35 is provided with a nozzle 37 at its end and a stop valve 38 interposed between the nozzle 37 and the control valve 33. A pressure measuring device 39 is mounted in the conduit 35 upstream of the stop valve 38 for measuring the pressure applied to the latter.

By way of example, the accumulator 36 may have a total volume of two litres and its bladder may be inflated to a pressure of 15 bars with a liquid, which may be the oil employed for lubrication during the rolling operation, supplied by a source of liquid under pressure by way of the conduit 34 at a pressure of 60 bars. Under these conditions, the nozzle 37 may be placed at 30 mm from the band and the valve 38 may be adapted to open at a pressure of 10 bars so as to maintain the conduit 35 full of liquid at a minimum pressure of 10 bars.

In operation, the control valve 33 causes, in one position thereof, the filling of the accumulator and, in its other position, the discharge of this accumulator into the conduit 35. The pressure in the latter then rises above 10 bars and consequently opens the valve 38 and projects liquid through the nozzle 37 which produces the desired shock in the band 1. The pressure wave is detected upstream of the valve 38 by the pressure measuring device 39. The latter is connected to the electric detecting circuit 6a which, through the agency of the threshold stage 14, gives the instant of the start of the counting. As in the foregoing embodiments, the instant of the arrival of the disturbance is detected by a detector 6b which permits the time of propagation $t$ of this disturbance to be determined by the circuit shown in FIG. 2.

This embodiment of the apparatus according to the invention is particularly advantageous, since it may be easily applied to any rolling mill employing a lubricating liquid.

It will be understood that other appropriate means, for example acoustic means, may be employed for producing a disturbance in the band, the apparatus having a single detector or two detectors, depending on whether these means are, or are not, adapted to detect the instant of the start of the disturbance.

There may also be employed as the detecting device any type of detector capable of measuring a displacement, a speed, or an acceleration.

For example, a loud-speaker may be employed for producing vibrations and furnishing a start signal associated with a piezo-electric pickup of a record player acting as a detector, or an electromagnetic hammer and two piezo-electric pickups or an electromagnetic hammer and two transducers having a differential transformer having rollers and plungers.

However, the detectors of these apparatus are not as easy to use as eddy current detectors, which have the advantage of not being in contact with the band, and they do not produce signals which are as easily utilized electronically.

In the case of a band issuing from a rolling mill, vibrations produced by the rolling mill may also be employed for measuring stress and planarity.

If the vibrations are produced at the same moment throughout the width of the band, for example by a roll flat or owing to the increase in diameter of the storage reel when a coil or turn is added, there may be employed a single detector per longitudinal section and the differences of time that this disturbance takes to travel through the same distance in each one of the longitudinal regions measured.

If vibrations are produced in the rolling mill at different instants in the width of the band, two detectors per longitudinal section are employed and there is measured by correlation the difference between the instant of passage of a spectrum of vibration in the region of the detectors. In this case, a single correlator may suffice for all the sections, with this correlator analyzing the different sections of the band in succession.

Having now described my invention what I claim as new and desire to secure by Letters Patent is:

1. A method for measuring the tensile stress in a band subjected to tension, comprising producing a disturbance in the band transversely of the band, measuring the time that said disturbance takes to travel through a predetermined distance along the band, calculating the velocity of propagation c of said disturbance, and calculating the tensile stress $\sigma$ in the band from the formula $\sigma = p.c.^2$ in which p is the volumic mass of the band.

2. A method for measuring the state of planarity of a band subjected to tension, comprising producing a disturbance in the band transversely of the band in a plurality of longitudinal regions of the band, which regions are parallel to the longitudinal direction of the band and arranged transversely of the band between one lateral edge and an opposite lateral edge of the band, measuring the times that the disturbance takes to travel through a predetermined distance in each one of said longitudinal regions of the band, and comparing said measured times, which comparison represents the state of planarity of the band according to the formula:

$$\frac{a}{\lambda} = \sqrt{\frac{-2\rho l^2}{E\pi^2} \cdot \frac{\Delta t}{t^3}}$$

which characterises a planarity defect in the band and wherein:

- a is the half-amplitude of a corrugation of a band whose middle part is taut and whose edges have corrugations;
- $\lambda$ is the wavelength of one corrugation;
- E is Young's modulus;
- p is the volumic mass of the band;
- l is said predetermined distance;
- t is the time that the disturbance takes to travel through said predetermined distance in one of said longitudinal region;
- $\Delta t$ is the difference of time of propagation from said region to another.

3. A method as claimed in claim 2, comprising producing said disturbances simultaneously in said longitudinal regions of the band and comparing the differences of time taken by said disturbances to travel through the same distance in each one of said longitudinal regions.

4. A method for measuring the state of planarity of a band subjected to tension, comprising producing a disturbance in the band transversely of the band in a plurality of longitudinal regions of the band, which regions are parallel to the longitudinal direction of the band and arranged transversely of the band between one lateral edge and an opposite lateral edge of the band, calculating the velocity of propagation c of said disturbance in each one of said longitudinal regions of the band from a known value of said predetermined distance and comparing the calculated speeds of propagation, which comparison represents the state of planarity of the band according to the formulae $c = l/t$ and $$\frac{a}{\lambda} = \sqrt{\frac{-2\rho l^2}{E\pi^2} \cdot \frac{\Delta t}{t^3}}$$

which characterises a planarity defect in the band and wherein:

- a is the half-amplitude of a corrugation of a band whose middle part is taut and whose edges have corrugations;
- $\lambda$ is the wavelength of one corrugation;
- E is Young's modulus;
- p is the volumic mass of the band;
- l is said predetermined distance;
- t is the time that the disturbance takes to travel through said predetermined distance in one of said longitudinal region;
- $\Delta t$ is the difference of time of propagation from said region to another.

5. A method as claimed in claim 4, wherein said disturbance is produced in succession in each one of said longitudinal regions of the band, each disturbance being produced when the disturbance which preceded it is substantially completely absorbed.

6. A method for measuring the state of planarity of a band subjected to tension, comrising producing a disturbance in the band transversely of the band in a plurality of longitudinal regions of the band, which regions are parallel to the longitudinal direction of the band and arranged transversely of the band between one lateral edge and an opposite lateral edge of the band, calculating the tensil stress $\sigma$ in each one of said longitudinal regions and comprising said calculated stresses, which comparison represents the state of planarity of the band, according to formulae $\sigma = p. l^2/t^2$ and $$\frac{a}{\lambda} = \sqrt{\frac{-2\rho l^2}{E\pi^2} \cdot \frac{\Delta t}{t^3}}$$

which characterises a planarity defect in the band and wherein:

- a is the half-amplitude of a corrugation of a band whose middle part is taut and whose edges have corrugations;
- $\lambda$ is the warelength of one corrugation;
- E is Young's modulus;
- p is the volumic mass of the band;
- l is said predetermined distance;
- t is the time that the disturbance takes to travel through said predetermined distance in one of said longitudinal region;
- $\Delta t$ is the difference of time of propagation from said region to another.

7. A method as claimed in claim 6, wherein said disturbances is produced in succession in each one of said longitudinal regions of the band, each disturbance being produced when the disturbance which preceded it is substantialle completely absorbed.

8. An apparatus for measuring the tensile stress in a band subjected to tension, comprising means for producing a disturbance in the band transversely of the band, detecting means comprising a first detecting device and a second detecting device disposed at a given distance from each other along said band and capable of producing in succession a first electric pulse and a second electric pulse in response to the disturbance of the band in their respective region, and an electric measuring circuit capable of measuring the time $t$ that elapses between said pulses, said time being related to the tensile stress $\sigma$ in the band by the formulae: $\sigma = p.c^2$ and $c = l/t$ wherein:

$p$ is the volumic mass of the band;

$c$ is the velocity of propagation of said disturbance; and $l$ is said given distance.

9. An apparatus as claimed in claim 8, wherein the means for producing a disturbance in the band comprises an electromagnetic hammer device including a member constituting a hammer and an electric coil, the coil being combined with said member to suddenly displace said member into contact with the band.

10. An apparatus as claimed in claim 9, wherein said electromagnetic hammer device is disposed under the band.

11. An apparatus as claimed in claim 10, wherein the detecting means comprise an electric circuit combined with said member, so that the closure of said circuit is ensured by the contact between the said member and the band.

12. An apparatus as claimed in claim 8 wherein the means for producing a disturbance in the band is of the electropneumatic type and comprises a tank provided with an inlet conduit for connection to a source of compressed air and an outlet conduit opening out in proximity to the band, and two electrically-operated valves respectively disposed in the inlet and outlet conduits for charging the tank and discharging the tank and produce the disturbance in the band.

13. An apparatus as claimed in claim 8 wherein the means for producing a disturbance in the band is of the electrohydraulic type and comprises an accumulator, an inlet conduit for connection to a source of liquid under pressure, an outlet conduit, a control valve adapted to connect the accumulator alternately to the inlet conduit and to the outlet conduit, a nozzle disposed at an end of the outlet conduit and in the vicinity of the band so that the liquid supplied to the accumulator in one of the positions of the control valve is discharged through the nozzle and produces the disturbance in the band when the control valve is in the other position.

14. An apparatus as claimed in claim 13, wherein the outlet conduit includes a stop valve capable of opening when the pressure in the outlet conduit exceeds a minimum value.

15. An apparatus as claimed in claim 14, wherein the detecting means comprise a pressure measuring device inserted in the outlet conduit upstream of the stop valve relative to the flow of the liquid and an electric circuit connected to the pressure measuring device for delivering a pulse in response to a pressure wave detected by the pressure measuring device.

16. An apparatus as claimed in claim 8, wherein the detecting means comprise at least one eddy current detector.

17. An apparatus as claimed in claim 8, wherein the electric measuring circuit comprises a NAND gate, two parallel channels having inputs connected respectively to said first and second detecting devices and outputs connected respectively to two inputs of the NAND gate, each channel comprising a threshold stage and a memory flip-flop and said measuring circuit being capable of producing at an output of the NAND gate a pulse signal whose width is equal to the time of propagation of the disturbance between the first detecting device and second detecting device when the first pulse and second pulse are applied respectively to the inputs of said channels.

18. An apparatus for measuring the planarity state of a band subjected to tension comprising means for producing a disturbance in the band transversaly of the band, a set of detecting means each associated to a respective one of a plurality of longitudinal regions of the band arrangeged, parallel to the longitudinal direction of the band, between one edge and the other edge of the band, each detecting means comprising a first detecting device and a second detecting device disposed at a given distance from each other along said respective region of said band and capable of producing in succession a first electric pulse and a second electric pulse in response to the disturbance of the band adjacent said first and second detecting devices respectively, an electric measuring circuit capable of measuring the time $t$ that elapses between said first and second pulses, and means for comparing the times measured in each one of said longitudinal region, which comparison represents the state of planarity of the band according to the formulae:

$$\frac{a}{\lambda} = \sqrt{\frac{-2 p l^2}{E \pi^2} \cdot \frac{\Delta t}{t^3}}$$

which characterises a planarity defect in the band and wherein:

$a$ is the half-amplitude of a corrugation of a band whose middle part is taut and whose edges have corrugations;

$\lambda$ is the wave length of one corrugation;

$E$ is Young's modulus;

$p$ is the volumic mass of the band;

$l$ is said predetermined distance;

$t$ is the time that the disturbance takes to travel through said predetermined distance in one of said longitudinal region;

$\Delta t$ is the difference of time of propagation from said region to another.

19. An apparatus as claimed in claim 18, wherein each means for producing a disturbance in the band comprises an electromagnetic hammer device including a member constituting a hammer and an electric coil, the coil being combined with said member to suddenly displace said member into contact with the band.

20. An apparatus as claimed in claim 19, wherein each said electromagnetic hammer device is disposed under the band.

21. An apparatus as claimed in claim 20, wherein each detecting means comprises an electric circuit combined with said member, so that the closure of said circuit is ensured by the contact between the said member and the band.

22. An apparatus as claimed in claim 18, wherein each means for producing a disturbance in the band is of the electropneumatic type and comprises a tank provided with an inlet conduit for connection to a source of compressed air and an outlet conduit opening out in proximity to the band, and two electrically operated valves respectively disposed in the inlet and outlet conduits for charging the tank and discharging the tank and produce the disturbance in the band.

23. An apparatus as claimed in claim 18, wherein each means for producing a disturbance in the band is of the electrohydraulic type and comprises an accumulator, an inlet conduit for connection to a source of liquid under pressure, an outlet conduit, a control valve adapted to connect the accumulator alternately to the inlet conduit and to the outlet conduit, a nozzle disposed at an end of the outlet conduit and in the vicinity of the band so that the liquid supplied to the accumulator in one of the positions of the control valve is discharged through the nozzle and produces the disturbance in the band when the control valve is in the other position.

24. An apparatus as claimed in claim 23, wherein the outlet conduit includes a stop valve capable of opening when the pressure in the outlet conduit exceeds a minimum value.

25. An apparatus as claimed in claim 24, wherein each detecting means comprises a pressure measuring device inserted in the outlet conduit upstream of the stop valve relative to the flow of the liquid and an electric circuit connected to the pressure measuring device for delivering a pulse in response to a pressure wave detected by the pressure measuring device.

26. An apparatus as claimed in claim 18, wherein each detecting means comprises at least one eddy current detector.

* * * * *